United States Patent [19]
Ishiyama

[11] Patent Number: 5,632,351
[45] Date of Patent: May 27, 1997

[54] POWER CONVERTER AND ELECTRIC CAR DRIVE SYSTEM EMPLOYING THE SAME

[75] Inventor: Hiroshi Ishiyama, Anjo, Japan

[73] Assignee: Nippondenso Co., Ltd., Kariya, Japan

[21] Appl. No.: 391,493

[22] Filed: Feb. 17, 1995

[30] Foreign Application Priority Data

Feb. 18, 1994 [JP] Japan .................. 6-020993

[51] Int. Cl.$^6$ ............................. B60K 1/00
[52] U.S. Cl. ........................... 180/651; 180/65.8
[58] Field of Search ................ 180/65.1, 65.8, 180/65.2, 65.3, 65.4; 363/109; 310/159, 165

[56] References Cited

U.S. PATENT DOCUMENTS

| | | | |
|---|---|---|---|
| 5,172,784 | 12/1992 | Varela, Jr. .................. | 180/65.8 |
| 5,251,680 | 10/1993 | Minezawa et al. ........... | 180/65.1 |
| 5,363,933 | 11/1994 | Yu et al. .................... | 180/65.1 |
| 5,492,192 | 2/1996 | Brooks et al. .............. | 180/65.8 |

FOREIGN PATENT DOCUMENTS

| | | |
|---|---|---|
| 5-95606 | 4/1993 | Japan . |
| 5219607 | 8/1993 | Japan . |
| 5292703 | 11/1993 | Japan . |

Primary Examiner—Richard M. Camby
Attorney, Agent, or Firm—Cushman, Darby & Cushman IP Group of Pillsbury Madison & Sutro LLP

[57] ABSTRACT

A power converter having substantially a "U" shape is mounted on the axial side of a motor from which a drive shaft protrudes. Due to the opening end of the "U" shape, the power converter may be removed from the motor or mounted thereon while a load such as vehicle wheels are connected to the motor.

23 Claims, 5 Drawing Sheets

POWER CONVERTER AND ELECTRIC CAR DRIVE SYSTEM EMPLOYING THE SAME

CROSS-REFERENCE TO RELATED APPLICATION

This application is related to and claims priority under 35 U.S.C. § 119 from Japanese Patent Application No. Hei. 6-20993, incorporated herein by reference.

BACKGROUND OF THE INVENTION

1. Field of the Invention

The present invention relates to a power converter. More specifically, the invention relates to an inverter or DC-AC converter which converts DC drive power to AC power to drive a motor connected to the wheels of an electric car.

2. Description of the Related Art

Japanese Patent Application Laid-Open No. Hei. 5-219607 discloses a power converter mounted around the motor drive shaft of a motor in an electric car. More specifically, this system includes a motor in a substantially cylindrical shape and a drive shaft protruding from one end of the motor which transmits the motor torque to the wheels of the electric car. In that system, the inverter is mounted on the end of the motor opposite the shaft.

In systems using a single shaft motor as described above, the processes of removing and installing the inverter are relatively trouble-free since the side of the motor opposite the shaft is flat and there are no members which might restrict the seating of the inverter. However, when using a dual shaft motor on which the motor shaft extends from both ends to drive respective vehicle wheels, the shaft obstructs the mounting of the inverter so that it is impossible to mount it on an end of the motor like a conventional single shaft motor. In most cases, since the motor shaft generally protrudes from the center on the side end face of the motor, a doughnut-shaped inverter may be provided to avoid interference with the centrally located shaft. However, if this structure is used in an electric car, it is impossible to remove or install the inverter while the shaft is connected to a load such as the vehicle's wheels; thus, that the inverter cannot be maintained, inspected or replaced while it is mounted on the vehicle.

SUMMARY OF THE INVENTION

With the above problems of the prior art in mind, the present invention provides an inverter which can be removed or installed while a load is connected to the motor.

To achieve this goal, a preferred embodiment of the present invention provides a power converter which is mounted on one end of an electric car drive motor having a drive shaft extending therefrom, where the power converter has substantially a "U" shape with an open end or cutout thereof disposed in a radial direction with respect to the end. According to this feature, since the power converter has a U-shaped profile, it can be removed or installed even if the vehicle wheels are connected to the motor shaft; thus, the power converter can be easily maintained and replaced.

Further, a power converter according to a preferred embodiment of the present invention also includes first and second switching modules which are disposed in the converter on both sides of the cutout and which control power supplied to the motor, and a third switching module which is disposed at a side of the "U" shape opposite the cutout and which also controls the power supplied to the motor.

According to this feature, since the switching modules are disposed at both sides of the open end of the converter and at the side of the converter opposite the open end, the switching modules can be arranged on the power converter with an efficient use of space so that the overall size of the power converter can be reduced.

Still further, a power converter according to a preferred embodiment of the present invention provides output terminals of the first, second and third switching modules which are connected internally to the input terminals of the motor.

According to this feature, since the distance from the output terminals of the switching modules and the motor terminals can be minimized, noise generation can be suppressed and the overall size of the converter can be reduced.

Yet further, a power converter according to the present invention includes positive and negative terminals disposed between each of the first and second switching modules and the third switching module, where the positive and negative terminals are electrically connected to the direct current input terminals of the switching modules.

According to this feature, since the terminals are provided between the first and second switching modules and the third switching module, the distance between the terminals and respective switching modules can be approximately equalized.

Further, a power converter according to the present invention includes current detectors disposed proximate to the switching module output terminals, for detecting the current supplied to the motor. The preferred embodiment also includes smoothing capacitors to shape the inverter's output waveform, and the current detectors may be used as mounts to hold the capacitors in place.

According to this feature, by disposing the current detectors close to the output terminals of the switching modules, the overall size of the converter can be reduced because the current detectors also serve as the capacitor mounts.

Still further, in a power converter according to a preferred embodiment of the present invention, the smoothing capacitors are disposed proximate to the direct current input terminals at the top of the switching module and are connected to the positive and negative terminals.

According to this feature, since the smoothing capacitors are disposed proximate to the output terminals at the top of the switching modules, the length of electrical paths between respective capacitors and switching modules can be minimized so that wiring inductance and potential voltage surges also can be minimized.

Yet further, a power converter according to a preferred embodiment of the present invention has a cooling fluid path for conveying heat, where the fluid path is disposed on the side face of the inverter which is mounted nearest to the motor.

According to this feature, since the cooling fluid path for heat radiation is provided on a side face of the converter which is closest to the motor, the heat sinking effect thus provided may be used by the power converter as well as the motor to save space.

Further, a preferred embodiment of the present invention provides a driving system of electric car which includes a motor as a source of motive power, a shaft which protrudes from roughly the center of a side face of the motor and which transmits motor torque to a load connected to the motor, and a power converter in an approximate "U" shape having a cutout in its radial direction, where the power converter is mounted on a side face of the motor with the cutout disposed around the motor shaft.

According to this feature, it is possible to implement a driving system for an electric car which permits removal of the power converter while a load (e.g., the vehicle wheels) is connected to the motor's shaft, so that maintenance of the power converter is simplified.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PRESENTLY PREFERRED EXEMPLARY EMBODIMENTS

Hereinafter a preferred embodiment of a power converter according to the present invention which is suitable for use in an electric car will be explained with reference to the drawings.

Figure 1:
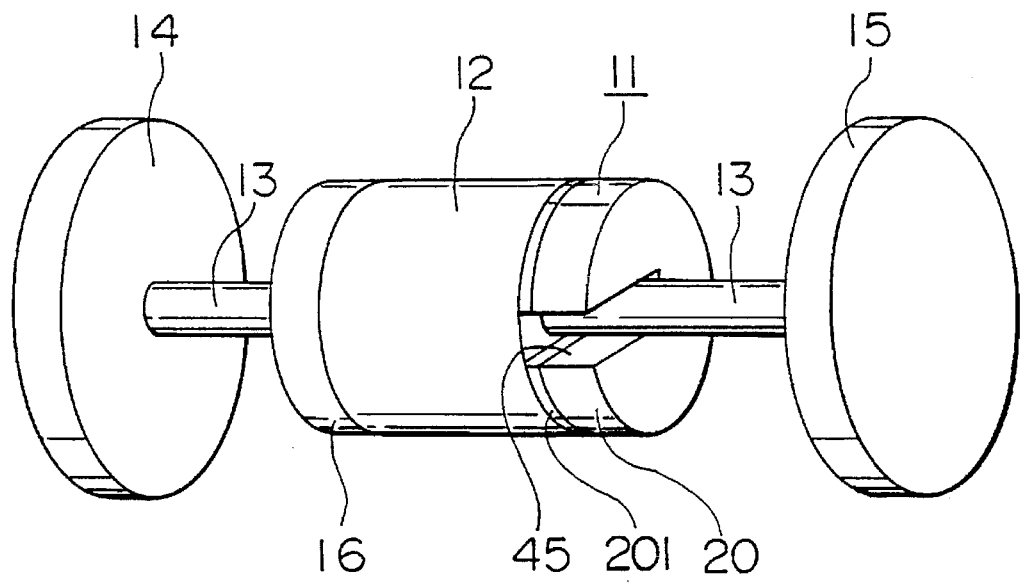
FIG. 1 is a partial perspective view showing a power converter according to the present invention when installed in an electric car.
Figure 10:
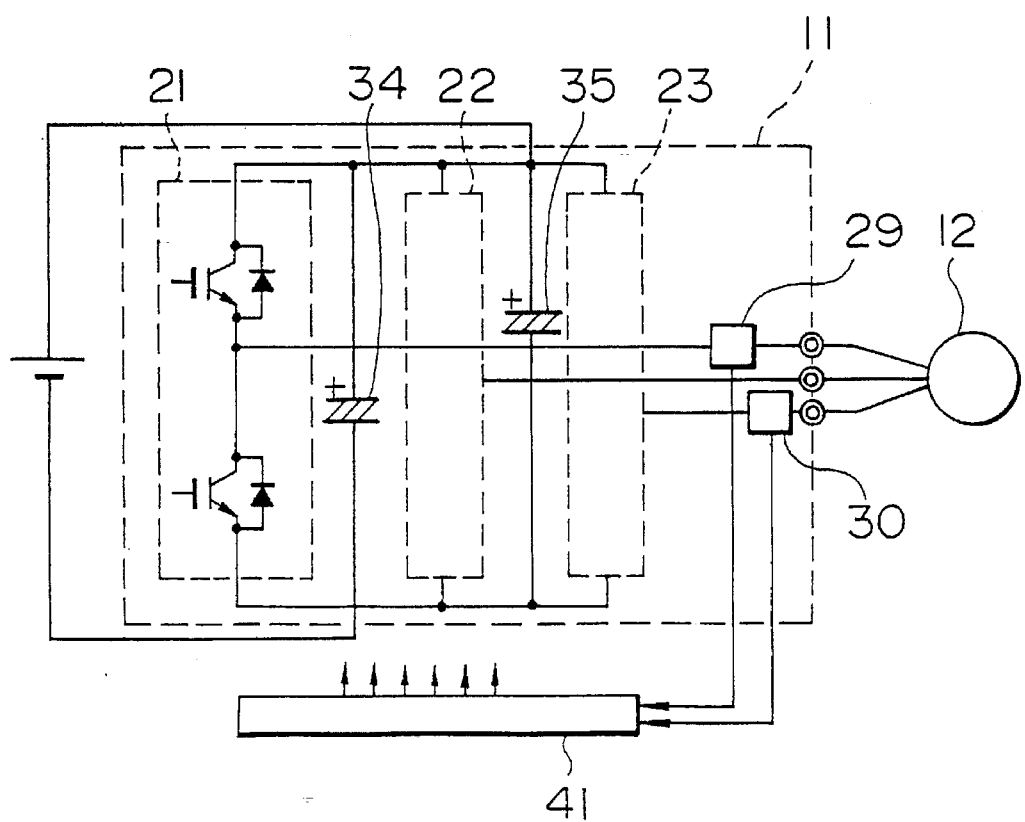
FIG. 10 is a schematic diagram showing electrical connections between various components in the inverter.

FIG. 1 shows the integral structure of the power converter (e.g., an inverter) and motor according to this embodiment. In FIG. 1, reference numeral 11 denotes the inverter, 12 a motor which drives shafts extending in two directions opposite one another, 14 and 15 wheels which are attached to and turn with the shaft 13, and 16 a differential gear.

In an interior portion thereof, the inverter 11 is electrically connected to the motor 12 by directly connecting the electric terminals from the motor 12 for receiving driving power to the alternating current output terminals of the inverter 11 while it is mechanically connected to the motor 12 at an external portion thereof.

Further, as shown in FIG. 1, the inverter 11 has a shape approximately resembling the letter U and has an opening or cutout 45 in the motor's radial direction, where the cutout 45 is wider than the diameter of the motor's shaft 13.

Next, the structure of the inverter 11 is explained in detail according to FIG. 2 through FIG. 10.

Figure 2:
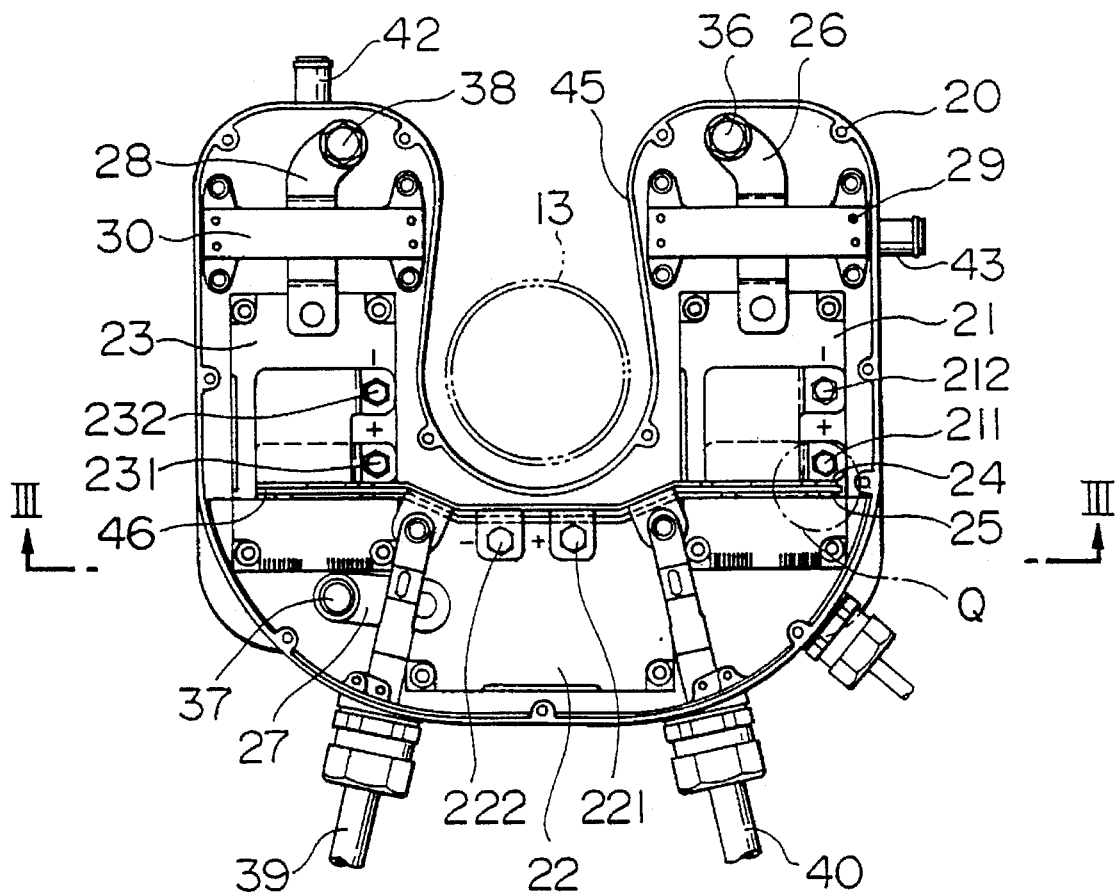
FIG. 2 is a top view showing a power converter according to the preferred embodiment.
Figure 3:
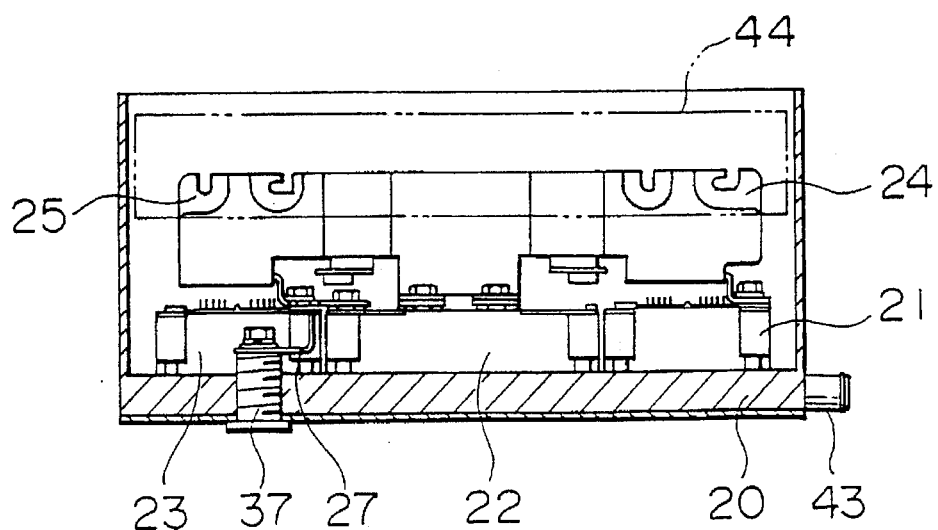
FIG. 3 is a cross-sectional view taken along line III—III in FIG. 2.
Figure 4:
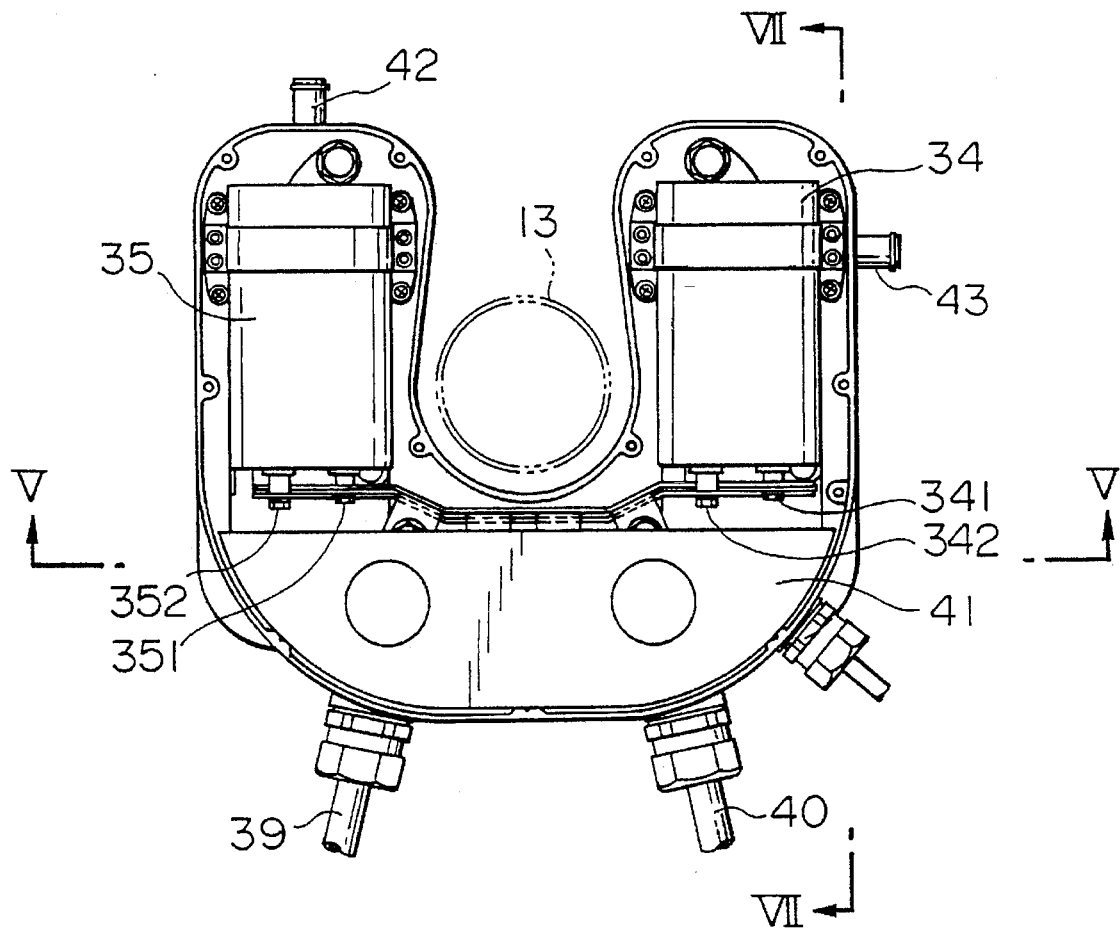
FIG. 4 is a top view showing a power converter according to the preferred embodiment.
Figure 5:
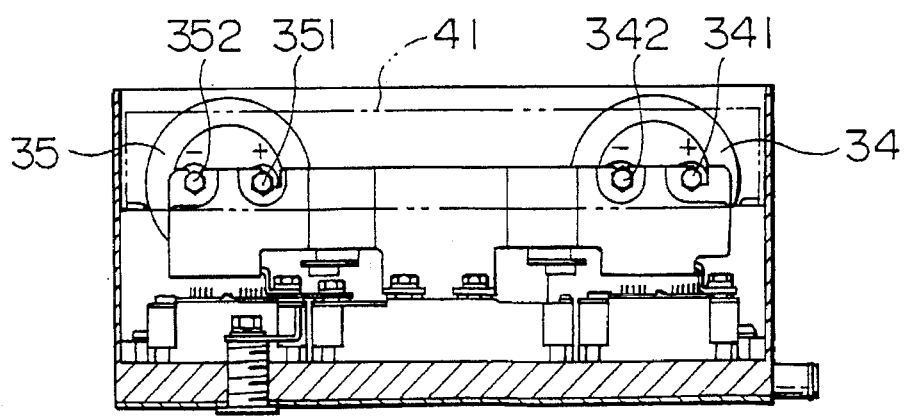
FIG. 5 is a cross-sectional view taken along line V—V in FIG. 4.
Figure 6:
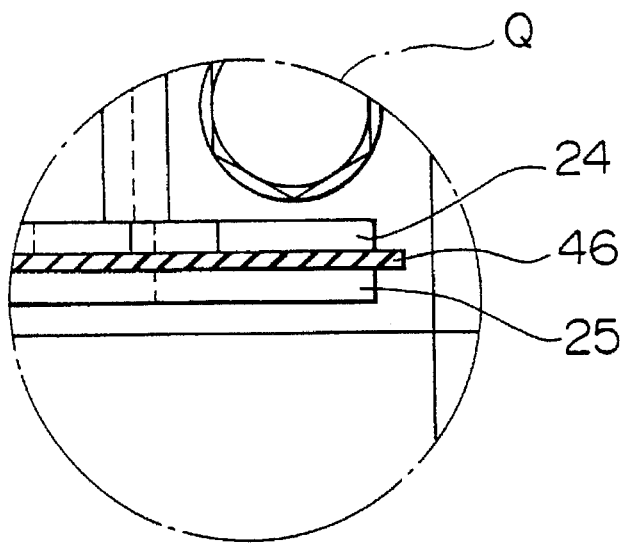
FIG. 6 is a detailed view of area Q in FIG. 2.
Figure 7:
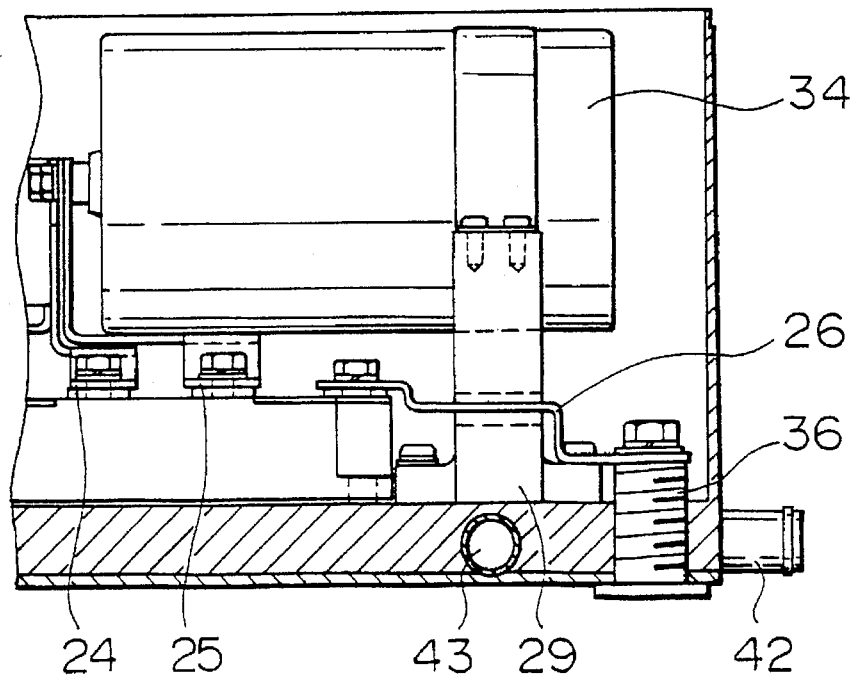
FIG. 7 is a cross-sectional view taken along line VII—VII in FIG. 4.

FIG. 2 shows the inverter 11 with the smoothing capacitors 34, 35 and a control circuit 41 being removed. FIG. 3 is a side elevation along line III—III in FIG. 2 with input cables 39 and 40 (see FIG. 4) being removed. FIG. 4 is a top view showing the inverter 11 with a cover 44 (see FIG. 3) being removed, and FIG. 5 is a side elevation along line V—V in FIG. 4. FIG. 6 shows a detailed view of the section Q in FIG. 2, and FIG. 7 is a view along line VII—VII in FIG. 4. It will be understood that cover 44 is part of a housing which generally encloses the inverter circuitry to protect it from the elements and other adverse environmental conditions.

In FIG. 2 and FIG. 3, reference numeral 20 denotes a heat sink which has a planar surface for mounting parts on one side face thereof and cooling fins (not shown) on the opposite side face and numerals 21–23 denote semiconductor or switching modules in which a pair of power transistors are connected in series with one another, and diodes are connected in parallel with each power transistor. Numerals 24 and 25 denote the positive and negative terminals (see FIG. 6), 26–28 denote alternating current output terminals, 29 and 30 denote the current detectors, 36–38 are terminals supplying power from the inverter 11 to the motor 12, and 39 and 40 are input cables supplying power from the direct current power source to the inverter 11. Further, in FIG. 4 and FIG. 5, reference numerals 34 and 35 represent the smoothing capacitors, and 41 denotes the control circuit.

The heat sink 20 is formed in substantially a "U" shape, and the semiconductor modules 21–23 are arranged on the heat sink 20 in a "U" shape, that is, at both sides of the relatively straight portions thereof and at the side opposite the cutout 45, and the current detectors 29 and 30 are disposed at the sides of the alternating current output terminals 26 and 28 of the semiconductor modules 21 and 23. Either one of the current detectors 29 and 30 may be disposed at a side of the alternating current output terminals 26 and 28 of semiconductor module 22.

The smoothing capacitors 34 and 35 are disposed in the vicinity of the terminals at the top of the semiconductor modules 21 and 23 and are fixed in place on the heat sink 20 using the current detectors 29 and 30 as their mounts. The capacitors' positive terminals 341 and 351 and negative terminals 342 and 352 are connected to the positive and negative input terminals 211, 212, 221, 222, 231 and 232 of the semiconductor modules 21–23 via the positive and negative terminals 24 and 25. Here, the positive and negative terminals 24 and 25 are overlapped and hold the insulation layer 46 therebetween except for the sections connected to other parts. The terminals 24 and 25 are disposed so that the distances between respective ones of semiconductor modules 21–23 and smoothing capacitors 34 and 35 will be as short as possible. These positive and negative terminals 24 and 25 are connected to the direct current power source via the input cables 39 and 40.

In addition, at the vicinity of the alternating current output terminals 26–28 of the semiconductor modules 21–23, the terminals 36–38 pass from the motor 12 through the heat sink 20, enter the inverter 11 and are connected to respective alternating current output terminals of the semiconductor modules 21–23 via the alternating current terminals 26–28.

The control circuit 41 driving the semiconductor modules 21–23 is fixed on the heat sink 20 and is connected to the current detectors 29 and 30 and the semiconductor modules 21–23 by conventional signal wires.

Figure 8:
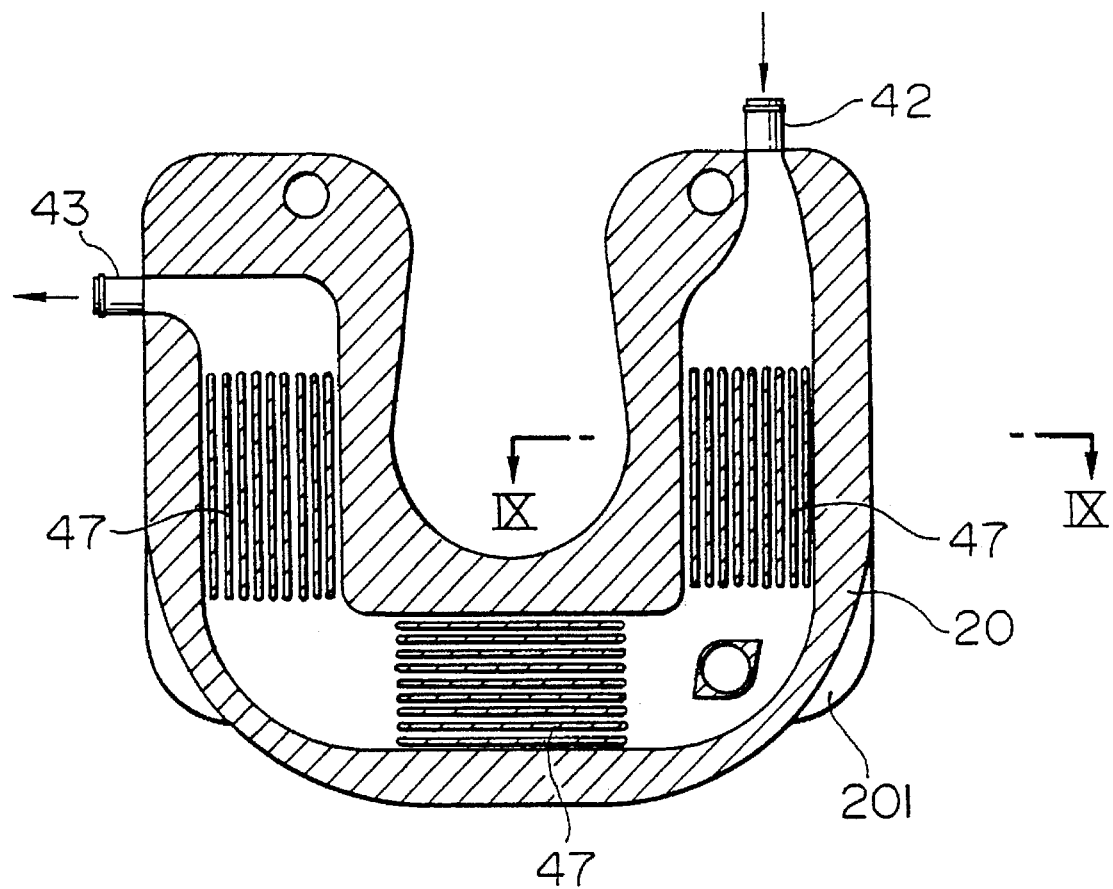
FIG. 8 is a cross sectional view showing a heat sink according to a preferred embodiment of the present invention.
Figure 9:
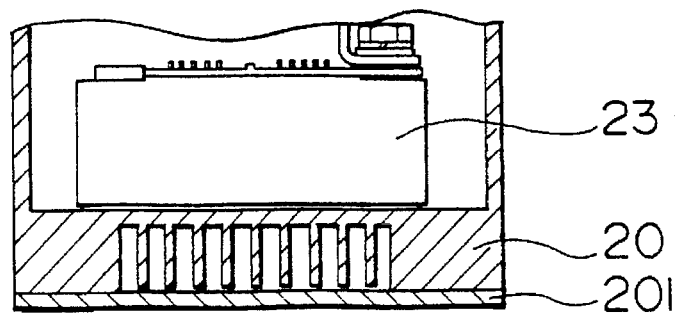
FIG. 9 is a cross sectional view taken along line IX—IX in FIG. 8.

A cross-section of the heat sink 20 is shown in FIG. 8 and its cross section along line IX—IX is shown in FIG. 9. Heat generated by the semiconductor modules 21–23 is transmitted to cooling fluid flowing in the inverter 11 via cooling fins 47 as shown by FIG. 8 and is discharged from the inverter 11. Cooling water is introduced through a pipe 42 and discharged through a pipe 43. The cooling fins 47 have substantially a "U" shape along the profile of the base plate 201 and the fins are disposed closely under the semiconductor modules 21–23 and coarsely or vacantly at other sections thereof. The cooling fins 47 may be provided on the motor side, and the effects of the cooling function can be utilized by the motor 12 and the inverter 11.

Further, the semiconductor modules 21–23 are switched according to drive signals generated by the control circuit 41 and convert direct current from the car electrical system into alternating current used by the motor 12. Upon receipt of alternating current, the motor 12 turns and the wheels 14 and 15 are consequently turned in a known manner. In more detail, as shown by the schematic diagram of FIG. 10, the smoothing capacitors 34 and 35 smooth the direct current input. In addition, the current detectors 29 and 30 detect the operational status of the inverter 11 and feed it back to the control circuit 41.

As described above, since the inverter 11 is designed substantially in a "U" shape, the inverter 11 can be removed from or installed on the motor 12 even though the vehicle wheels are connected to the motor shaft 13.

As shown by FIG. 1, particularly on an electric car utilizing a double-shaft motor, since a compact and light weight drive system which integrates the motor 12 and the inverter 11 can be provided, and the inverter 11 can be removed or installed without taking the motor 12 off of the vehicle and without disconnecting the wheels 14 and 15, maintenance of the inverter 11 becomes very easy.

Further, since the inverter 11 is disposed on the axial side face of the motor 12, the connectors connecting the alternating current output terminals 26–28, the inverter 11 and the motor 12 can be eliminated so that a low cost driving system can be provided.

In addition, by connecting the inverter 11 and the motor 12 internally and enclosing the external periphery of the inverter 11 with a case which also functions as a magnetic shield, noise emitted from the output wires can be minimized and noise leaking from the inverter 11 can be reduced to thereby minimize RF emissions. Further, by using motor terminals with bolts, etc., the motor terminals can also be used to lock the inverter in place so that the number of fixing bolts can be reduced.

Moreover, since the semiconductor modules 21–23 are disposed on both side of the motor axis in the radial direction thereof and approximately over the axis and the direct current input wires are disposed approximately at an intermediate position of respective modules 21–23, the length of the terminal connections are minimized and the distances from the direct current input to respective modules 21–23 can be made nearly even so that power equilibrium can be achieved. Further, by disposing the modules sideways relative to the motor axis, that is, arranging the modules in parallel with the motor axial side face, the axial width or thickness of the 11 inverter can be reduced.

Moreover, since the current detectors are disposed closely around the alternating current output terminals of the semiconductor modules and the motor terminals are close to the alternating current output terminals, the alternating current paths internal to the inverter can be minimized so that a compact, lightweight, low-cost and low-noise inverter can be provided.

Further, since the length of the motor also can be reduced by taking out the motor terminals from the side face in the axial direction, the driving system as a whole can be made compact, lightweight, low-cost and with low noise characteristics.

Furthermore, since the capacitors are disposed closely around the poles of the semiconductor modules, respective modules and capacitors are connected at a minimum distance therebetween and the positive and negative terminals overlap as much as possible to reduce the wiring inductance. Thus, generated surge voltages are suppressed and the semiconductor modules are less likely to be destroyed by overvoltage conditions. In addition, since the capacitor may consist of a pair of individual capacitors and the control circuit is disposed in the space over the remaining switching module, use of space in the inverter can be optimized.

Moreover, as shown by FIG. 8, since the fins are disposed densely under the modules while they are coarse or vacant at other sections of the inverter, a cooling plate with less voltage loss and higher efficiency can be utilized. Since the entire flow paths pass through the fin guide, the problem of trapped cooling fluid will not occur so that a high efficiency heat exchanger can be provided.

In addition, due to the "U" shape of the inverter, the pipe 42 used as the inlet of cooling water and the pipe 43 as the outlet are arranged in the top and bottom of the inverter, respectively, as depicted in the FIG. 1, so that air in the inverter can be easily vented even with a pump of relatively low discharge pressure and heat exchange of the entire modules can be performed.

Further, since a heat sink can be provided between the motor and the inverter, the cooling function provided thereby can be shared by those elements so that the drive system can be made compact and lightweight.

Although the smoothing capacitor may be made of two units in the preferred embodiment, a capacitor may be mounted on each semiconductor module. Because of this, each capacitor may of small size and further the surge voltages generating from each semiconductor module can be controlled equally.

Moreover, although the above embodiment refers to a case where an alternating current motor with a double-sided shaft is used for the motor and the inverter for the power converter, it is apparent that the type of motor and power converter are not particularly limited to this combination and, for example, a direct current motor having a single shaft driven by a chopper is also contemplated.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A power converter for converting electricity to provide operative power to a motor in an electric car drive system having an electrical power source, said converter comprising:

a power converter element;

a housing substantially enclosing said converter element, a surface of said housing defining a cutout recessed radially from an outer peripheral portion of said housing;

a set of input terminals mounted on said housing for electrically connecting said converter element to said electrical power source; and a set of output terminals for electrically connecting said converter element to said motor to provide operative power;

wherein said converter housing is adapted to be mounted on said motor so that a drive shaft extending from said motor is accommodated in said cutout.

2. The converter of claim 1 wherein:

said housing comprises a first arm portion on a first side of said cutout, a second arm portion on a second side of said cutout opposite said first side, and a base portion at an end of said cutout, said base portion connecting said first and second arm portions;

said converter element comprises first and second switching modules respectively disposed within said first and second arm portions and a third switching module disposed within said base portion; and said first, second and third switching modules are operatively connected to said set of input terminals and said set of output terminals for controlling conversion of electricity from said power source to provide said operative power to said motor.

3. The converter of claim 2, wherein each of said first, second and third switching modules includes a pair of output terminals and said converter input terminals are disposed proximate to said switching module output terminals.

4. The converter of claim 2, wherein said converter output terminals are recessed within said housing to accommodate motor drive terminals extending into said housing.

5. The converter of claim 2, wherein:

a first of said converter input terminals is a positive converter input terminal and a second of said set of said converter input terminals is a negative converter input terminal;

each of said first, second and third switching modules includes a positive input terminal and a negative input terminal; and the switching module positive input terminals are connected to the positive converter input terminal and the switching module negative input terminals are connected to the negative converter input terminal.

6. The converter of claim 2, wherein:

each of said first, second and third switching modules includes a pair of output terminals; and said converter element further comprises at least one current detector detecting a level of current supplied to said motor, said at least one current detector being disposed proximate to said pairs of switching module output terminals.

7. The converter of claim 6, further comprising at least one smoothing capacitor mounted on and fixedly held in place by said at least one current detector.

8. The converter of claim 7, wherein each of said first, second and third switching modules includes a pair of input terminals and said at least one smoothing capacitor includes three smoothing capacitors, each of which is connected between a pair of input terminals of a corresponding switching module.

9. The converter of claim 1, further comprising heat transfer means proximate to a side of said housing adapted to be mounted on said motor, for conveying heat away from said converter and said motor.

10. The converter of claim 9, wherein said heat transfer means includes a conduit circulating cooling fluid therethrough.

11. An electric car drive system for converting electrical energy into motive power to drive said car, said system comprising:

a source of electrical energy;

a motor for generating said motive power, said motor having at least one shaft connected to a wheel of said car; and a power converter for converting electricity from said source and supplying said converted electricity to said motor, said converter including a housing substantially enclosing said converter, a surface of said housing defining a cutout recessed from a main portion of said housing, said converter being mounted on said motor so that a drive shaft extending from said motor is accommodated in said cutout.

12. The system of claim 11, wherein said motor has two shafts extending therefrom.

13. The system of claim 11, wherein said converter includes output terminals recessed within said housing to accommodate terminals of said motor which extend into said housing.

14. The converter of claim 11, further comprising heat transfer means proximate to a side of said housing mounted on said motor, for conveying heat away from said converter and said motor.

15. The converter of claim 14, wherein said heat transfer means includes a conduit circulating cooling fluid therethrough from a first side of said housing to a second side opposite said first side.

16. A method of operating an electric car which includes a drive motor having a first end of a drive shaft extending therefrom and a load connected to an end of said drive shaft opposite said motor, said method comprising the steps of:

converting, using a power converter mounted on said drive motor, electrical energy from a power source to converted electrical power for use by said drive motor;

applying said converted electrical power to said drive motor to transmit motive power through said load and thereby propel said car; and removing, radially through a cutout radially formed on said power converter, said power converter from said drive motor while said load is kept connected to said shaft.

17. The method of claim 16, wherein:

a second end of said drive shaft extends from an end of said motor opposite said first end of said drive shaft, an additional load being disposed on said second end of said drive shaft; and each of said load and said additional load is a vehicle wheel.

18. The method of claim 17, wherein said method further comprises the step of:

radially mounting said power converter on said drive motor through said cutout while said load is kept connected to said shaft.

19. The method of claim 18, wherein said mounting step is performed after said removing step.

20. A method of operating an electric car which includes a drive motor having a drive shaft extending therefrom and a load connected to an end of said drive shaft opposite said motor, said method comprising the steps of:

converting, using a power converter mounted on said drive motor substantially around said drive shaft, electrical energy from a power source to converted electrical power for use by said drive motor;

applying said converted electrical power to said drive motor to transmit motive power through said load and thereby propel said car; and removing said power converter from said drive motor while said load is kept connected to said shaft.

21. The method of claim 20, wherein:

said motor comprises an additional shaft at an end of said motor opposite said drive shaft, an additional load being disposed on an end of said additional drive shaft opposite said motor; and each of said load and said additional load is a vehicle wheel.

22. The method of claim 21, wherein said method further comprises the step of:

mounting said power converter on said drive motor substantially concentrically around said drive shaft while said load is kept connected to said shaft.

23. The method of claim 22, wherein said mounting step is performed after said removing step.

* * * * *